United States Patent [19]

Dubuque

[11] 4,097,163
[45] Jun. 27, 1978

[54] METHOD OF SWAGE JOINING A ROD END TO A TUBE AND THE PRODUCT THEREOF

[75] Inventor: Douglas K. Dubuque, Lynnwood, Wash.

[73] Assignee: Tyee Aircraft, Inc., Everett, Wash.

[21] Appl. No.: 757,950

[22] Filed: Jan. 10, 1977

[51] Int. Cl.² ............................................. F16B 29/00
[52] U.S. Cl. .................................. 403/274; 403/320; 403/46
[58] Field of Search ................. 403/320, 46, 343, 274, 403/77; 151/2 R, 2 A

[56] References Cited

U.S. PATENT DOCUMENTS

| | | |
|---|---|---|
| 3,163,197 | 12/1964 | Rosan et al. .......................... 151/2 R |
| 3,421,562 | 1/1969 | Orloff et al. .......................... 151/2 R |
| 3,652,111 | 3/1972 | Dent ..................................... 285/382 |
| 3,837,755 | 9/1974 | Benoit .................................. 403/274 |
| 3,942,838 | 3/1976 | Bailey ................................ 403/320 X |

FOREIGN PATENT DOCUMENTS 890,736  9/1953  Germany .............................. 403/343

*Primary Examiner*—Andrew V. Kundrat

[57] ABSTRACT

A metallic rod end is fixedly secured to a relatively softer metallic tube by providing imprinted screw threads on the rod free end. Then grooves are imprinted in the screw threads and to a depth not greater than that of the minor diameter of the screw threads and with the grooves extending axially of the rod end. The tube is provided with a threaded bore mating the screw threads on the rod end. The threads in the threaded bore are provided by imprinting and the entrance portion thereto has a diameter substantially equal to the major diameter of the screw threads. After threading the rod into the tube until the grooves are aligned with the entrance portion, then the tube is swaged causing flow of metal from the tube to the rod end and into the grooves therein. This first rod end may be provided with an internally threaded bore so as to function as an insert between the metallic tube and a second externally threaded rod end.

1 Claim, 5 Drawing Figures

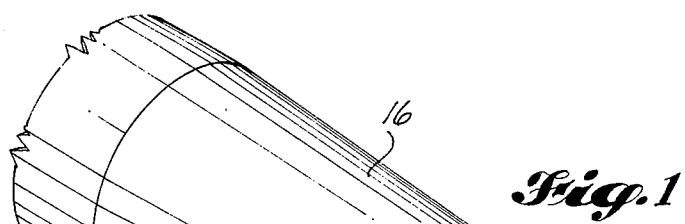
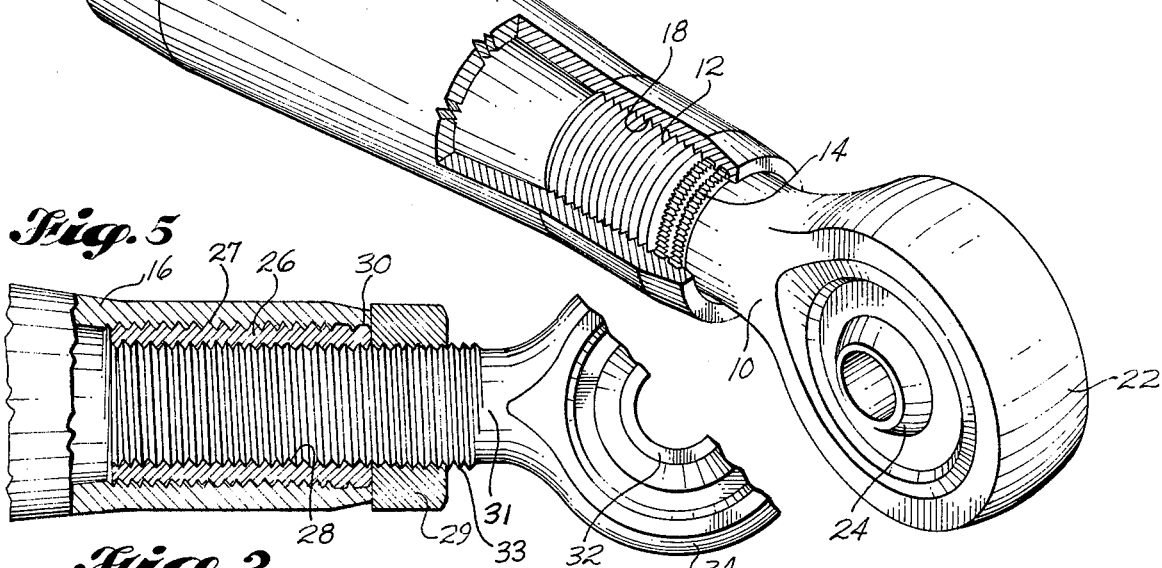
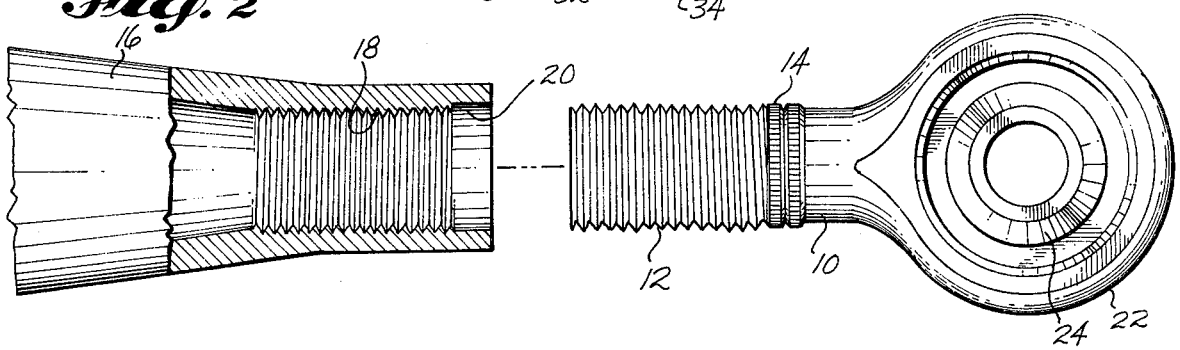
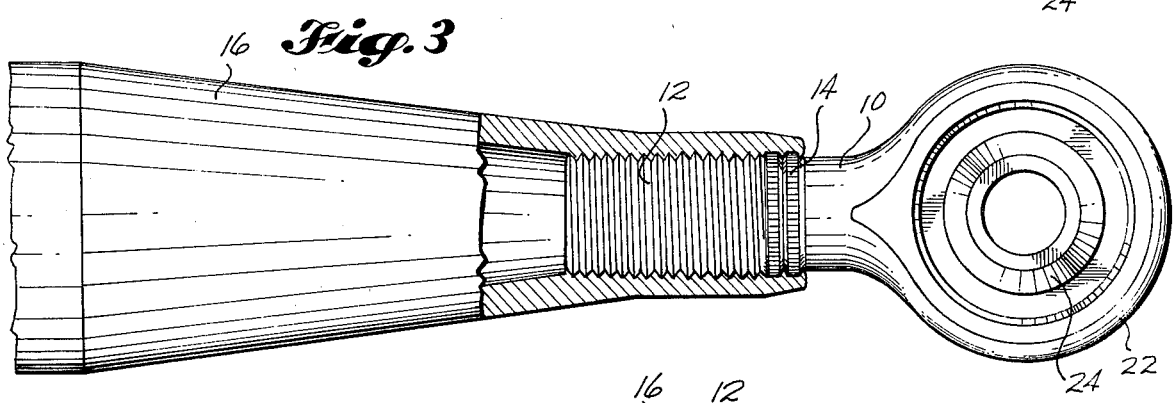
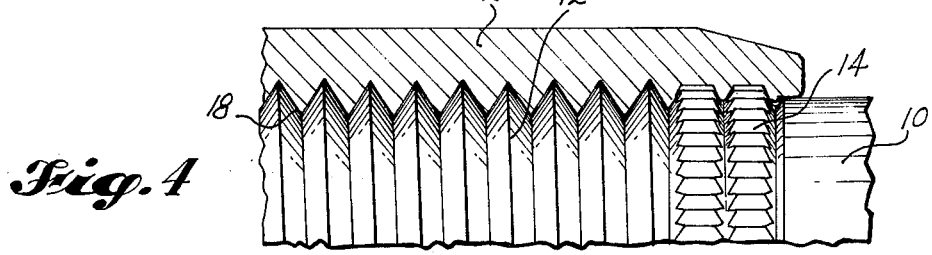

METHOD OF SWAGE JOINING A ROD END TO A TUBE AND THE PRODUCT THEREOF

BACKGROUND OF THE INVENTION

U.S. Pat. No. 3,652,111 discloses a way of swage joining a rod end portion, which may or may not be provided with an internally threaded bore so it may be used as a rod end or may be used as an insert between a second rod end and a tube. In such patent, the rod end portion was provided with, by indenting in it, a plurality of crests and grooves and a relatively softer tube was disposed over the rod end portion and the tube was swaged causing a flow of metal from the tube into the crests and grooves in the rod end portion. Thereafter, relative motion between the rod end portion and the tube was prevented by frictional engagement between the two. The present invention is differentiated therefrom by imprinting external screw threads on the rod end having major and minor diameters. Then grooves are imprinted in such screw threads and an end portion of such threads with a depth of not greater than the minor diameter of the screw threads. Next, a metallic tubular member, which is softer than said rod end, is provided with an imprinted, internally threaded bore which mates said external screw threads. The entrance portion to said threaded bore has a diameter equal to the major diameter of said screw threads. Thereafter, the rod end portion is threaded into the internally threaded bore of the tube and until the grooves are disposed in alignment with said entrance portion. Thereafter, the said metallic tube is swaged causing metal flow from the tube into the grooves in said screw threads. The grooves are preferably disposed parallel to the axis of the rod end and the rod end and the tube are preferably formed, respectively, of steel and aluminum.

SUMMARY OF THE INVENTION

The process and resulting product contemplate the providing of a metallic rod end of a suitable material, such as steel. This rod end is provided with external screw threads, preferably, by imprinting as distinguished from thread cutting for strength purposes. This rod end may be a part of a compression or tension load connector, as an eye bolt, clevis or the like, or an insert with an internal threaded bore to receive such a load connector. These screw threads have conventional major and minor diameters.

Grooves are provided in an end portion of such threads and extend crosswise thereof and preferably parallel to the axis of the rod end. These grooves are imprinted into the screw threads in the interest of maximum strength.

A tubular member is provided of softer material than the rod end, such as aluminum, and with an internally threaded bore having threads mating the external screw threads. Again, the threaded bore is provided by imprinting the threads in such bore and for strength purposes. The entrance portion of the threaded bore has a diameter substantially equal to the major axis of the screw threads. Thereafter, the rod end is threaded into the internally threaded bore of the tube and the grooves are aligned with the entrance portion to the threaded bore, the tube is swaged on the rod end causing metal flow from the tube to the rod end and into the grooves. If desired, the rod end may be later bored and internally threaded so that the rod end so processed will function as a sleeve to threadedly receive a compression or tension load transmitting member. Also, if the rod end is first provided with a threaded bore so it will function as a sleeve, a plug may be threaded into such bore to support the same while swaging occurs.

BRIEF DESCRIPTION OF THE DRAWINGS

FIG. 1 is a perspective view, with parts broken away, showing an embodiment of my invention;

FIG. 2 is an exploded, fragmentary, elevational view, with parts in section, of the structure of FIG. 1;

FIG. 3 is an elevational view, with parts in section, of the structure of FIG. 2 after interconnecting and swaging the tube to the rod end;

FIG. 4 is an enlarged fragmentary view of a portion of the showing of FIG. 3; and FIG. 5 is a sectional view, on a smaller scale, showing the tube structure of FIG. 3 with the addition of a swaged in sleeve carrying an adjustable and removable rod end portion.

DESCRIPTION OF A PREFERRED EMBODIMENT

Referring now to the figures, a rod end 10 illustrates a connector to a push-pull load, as an eye bolt, clevis, or the like. This rod end 10 is provided with external screw threads 12 having the usual major and minor diameters. These screw threads 12 extend from a free outer end portion of the rod 10 toward an inner end portion and with the screw threads 12 of a length commensurate with the intended maximum load. At the inner end of the screw threads 12, grooves 14 are disposed. Grooves 14 are preferably disposed in a direction parallel to the axis of the rod end 10 or at right angles to any turning moment tending to rotate or move rod end 10 relative to the tube 16.

A tube 16 is provided of softer material than the rod end 10, preferably of an aluminum alloy, and with the rod end 10 comprised of steel. This tube 16 has an internally threaded bore 18 mating the external screw threads 12 of the rod end 10.

The screw threads 12, grooves 14, and threads of internally threaded bore 18 are all, preferably, imprinted rather than being cut threads for maximum strength at all thread areas as connectors of the type involved are often designed for maximum strength with minimum weight factors.

An entrance portion 20 to the threaded bore 18 has a diameter substantially equal to, and not greater than, the major axis of screw threads 12 and thus the screw threads 12 can be readily threaded into the internally threaded bore 18 without interference until the grooves 14 are aligned with the entrance portion 20. Thereafter, a swaging force is applied to the external surface of the tube 16 and preferably the contact of the swaging tool with the tube 16 is limited to the external area of the tube aligned with the grooves 14 in the screw threads 12. With proper swaging, metal from the tube 16 is caused to flow and into the grooves 14. The cold swaging of the aluminum tube 16 results in a cold working thereof and with resultant increase in hardness.

At the time of swaging of the tube 16 to a rod end 10, the rod end 10 should be a solid member to provide adequate support against which the tube 16 is being swaged. Thus, the rod end 10 is shown as a part of a connector terminating in an eye 22 and with an antifriction bearing 24. However, if desired (see FIG. 5), rod end 10 may be later cut and the eye 22 and bearing 24 removed and the remainder 30 of rod end 10 provided with an internally threaded bore 26. Also, such part 30 may be originally formed as shown and plugged during swaging to prevent deformation. Thus, I have shown in FIG. 5, insert or nipple 26 having internal and external screw threads 28 and 27, respectively, grooves 30 in the end portion of threads 27, rod end 31 carrying eye 34 and bearing 32, and screw threads 33 of rod end 31 carrying nut 29. The rod end 31 is thus removable and the eye 34 and bearing 32 are angularly and linearly adjustable. Functionally, the parts of FIG. 5 correspond to the preceding figures: insert 26 and external threads 27 thereon to rod end 10 and screw threads 12 thereon and grooves 30 to grooves 14. Upon swaging of the tube 16, metal from the portion thereof over entrance portion 20 will flow into the grooves 30 of FIG. 5 or into the grooves 14 of the other figures.

The insert 26 will function as an internally and externally threaded insert and any suitable connector, illustrated by 31, may be threadedly received in the internal threads 28 of such an insert. When the connector is to fixed to a tube, the construction of FIGS. 1 to 4 will be employed and when an adjustable and detachable connector is to be connected to a portion of a rod end functioning as an insert, then the construction of FIG. 5 will be employed. Thus, the terms rod end as used herein shall include the rod end 10 of FIGS. 1–4, inclusive, or the externally threaded insert 26 of FIG. 5.

SUMMARY

In the foregoing, I have described and illustrated a method and product thereof, where a metallic rod end portion, as rod end 10 of FIGS. 1 to 4 or the insert 26 of FIG. 5, is provided with external screw threads 12 or 27, having major and minor diameters. The screw threads 12 or 27 are provided on the free end portion of the rod end 10 or insert 26. Next, I provide grooves 14 in the screw threads 12 or grooves 30 in the screw threads 27 and which grooves 14 and 30 extend crosswise of the screw threads 12, 27 and axially of the rod end 10 or insert 26, also parallel to the axis of rod end 10 or screw threads 27 and also at right angles to any relatively turning force exerted on the rod end 10 or insert 26. Next, I provide a metallic tube 16, having a hardness less than that of the rod 12 or insert 26 and for example, the rod end 10 and insert 26 may be steel while the tube 16 may be aluminum. The tube 16 is provided with an internally threaded bore 18, the threads of which mate the threads of the screw threads 12 or external threads 27 of insert 26. An entrance portion is provided to the internally threaded bore 18 and which entrance portion has a diameter substantially equal to the diameter of the major axis of the screw threads 12 or 27. Next, I thread the rod 10 or insert 26 into the internally threaded bore 18 until the grooves 14 or 30 are aligned with the entrance portion 20 of the tube 16. Next, the swaging force is provided on the outside of the tube 16 and in the area over the said entrance portion thereof so that the tube at said entrance portion thereof is caused to provide metal flow from the tube 16 to the rod end 10 or insert 26 and into the grooves 14 or 20 thus securing the tube to the rod end or insert 26 and resisting forces tending to unscrew one from the other.

Preferably, all screw threads and grooves are provided by imprinting as distinguished from thread cutting to provide for maximum strength. Next, preferably, the rod end 10 and insert 26 are steel whereas, the tube 16 is of aluminum.

Obviously, changes may be made in the forms, dimensions, and the arrangement of the parts of my invention without departing from the principle thereof, the above setting forth only preferred forms of embodiment of my invention.

I claim:

1. A combination swage-joined steel rod end having external, imprinted, screw threads, having major and minor diameters, extending from a free end portion toward an inner end portion thereof and terminating in a plurality of parallel grooves extending into and crosswise of said screw threads to provide axially spaced rows of grooves which rows are normal to the axis of said steel rod, having a depth not greater than the minor diameter of said screw threads, and positioned in the rod adjacent the said inner end portion of said rod; and a relatively softer metallic tube threadedly connected to said rod end and swaged to the rod end by the flow of metal from said tube to said rod end at the area of said grooves in said screw threads.

* * * * *